April 17, 1951 F. M. M. B. SALOMON 2,548,911
OSCILLATIONS REDUCING DEVICE
Original Filed May 14, 1940 2 Sheets-Sheet 1
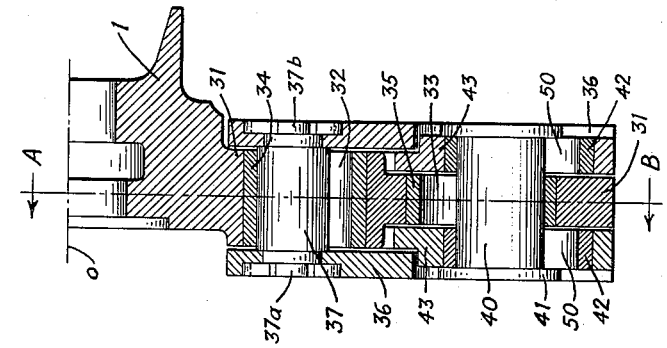
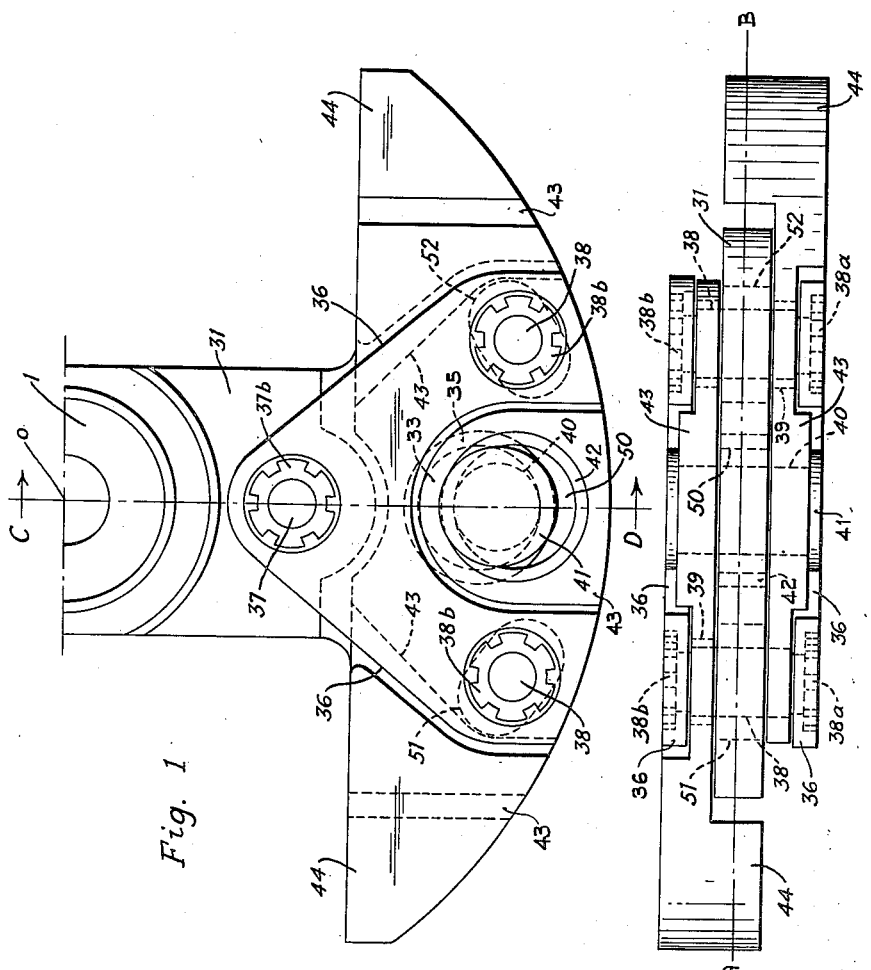
INVENTOR.
Francois M. M. B. Salomon
BY
F. Bascom Smith
ATTORNEY

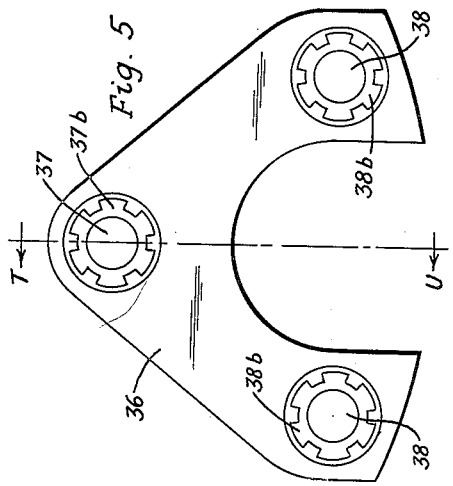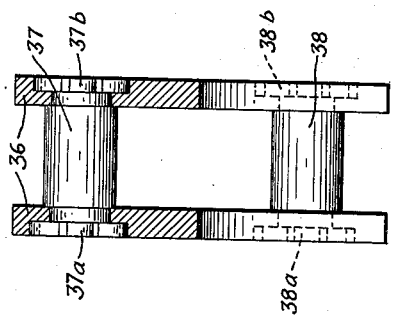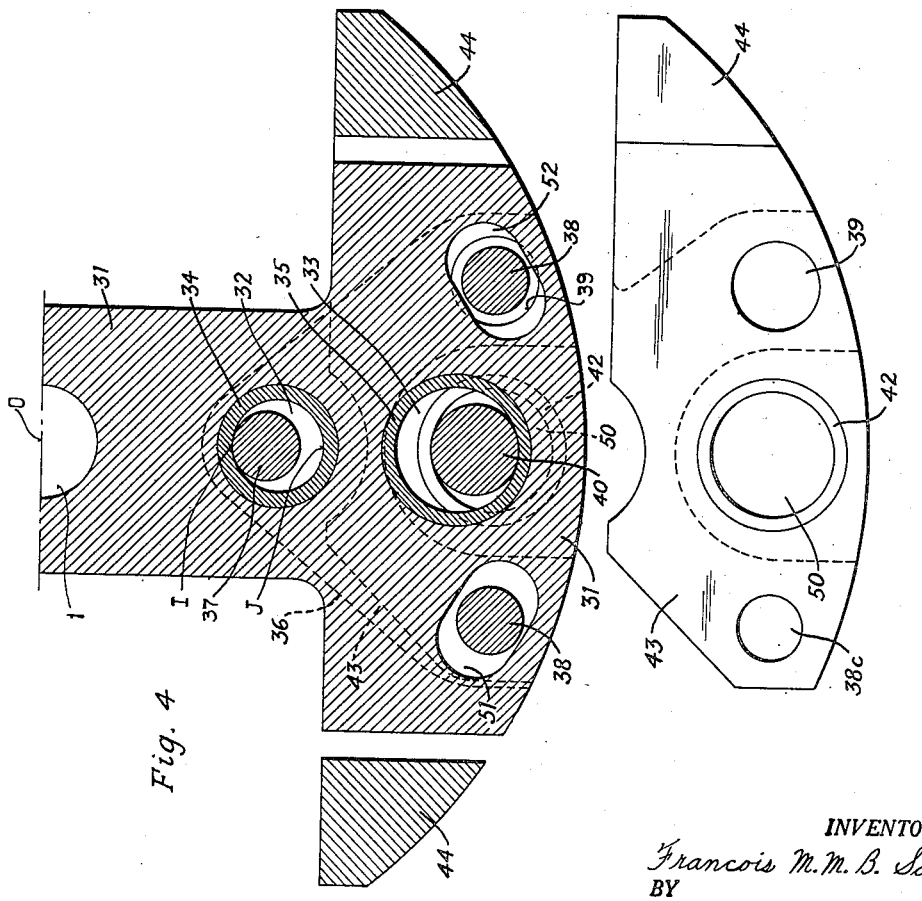

Patented Apr. 17, 1951

2,548,911

UNITED STATES PATENT OFFICE 2,548,911

OSCILLATIONS REDUCING DEVICE

François Marie Michel Bernard Salomon, Paris, France; vested in the Attorney General of the United States Original application May 14, 1940, Serial No. 335,081. Divided and this application May 25, 1945, Serial No. 595,839. In Luxembourg May 19, 1939

20 Claims. (Cl. 74—574)

This invention relates to devices for reducing oscillations, and vibrations in any structure, but more particularly in machine shafts.

This application is a division of my copending parent application Serial No. 335,081, filed May 14, 1940, for "Oscillations Reduction Device," and any subject matter contained in said parent application which is applicable to the disclosure of the present application is incorporated herein by reference.

The present invention is applicable to the damping of torsional, flexional and lateral oscillations.

The devices, according to the present invention, can be placed in any part of the machine, and, particularly, on the machine shaft. For instance, it may be placed at the front or at the rear of a crankshaft, in the crankshaft, in engine balance-weights, on ventilators or ventilator pulleys, in the arrangements of connecting rods, in propeller hubs, on aero shafts, and on marine shafts or the like.

The devices, according to the present invention are different from the centrifugal pendulums heretofore used as vibration dampers.

Indeed, in the centrifugal pendular systems the auxiliary centrifugal masses are submitted to the restoring force of the centrifugal forces acting on themselves.

On the contrary, a device, according to the present invention, comprises at least one member which is mounted to rotate with a shaft and which rocks or oscillates under the action of the disturbances. Said member is restored to its mean position by at least one centrifugal restoring member carried by said oscillating member and operatively connected with a part which is rotatively movable with or, more particularly, integral with the shaft. The reaction of said part is the force which produces the restoration.

In devices comprehended by the present invention the force which restores the oscillating member to its mean position is due entirely, or almost entirely, to the restoring forces resulting from the action exerted by the restoring member carried by the oscillating member, whereas, in the case of centrifugal pendulums, the restoring force is due to the action of the centrifugal forces acting on the oscillating masses themselves.

The centrifugal restoring member acts more particularly as a restoring lever, the axis of which is carried by the oscillating member, and restores the latter to its mean position by being opera- tively connected with a member integral with the rotary shaft. In general the restoring member is effectively a lever, but the same can also act differently. The oscillating member can be centered or not on the axis of the shaft which creates the centrifugal forces and which may or may not be the shaft that is subjected to the disturbances. The oscillating member may be in the form of a plate, a disc, or a fraction of a disc or a flywheel. In a general way it may be called a "harmonic disc," even if properly speaking it is not in the shape of a disc. As has already been seen, its working is entirely different from the working of centrifugal pendulums.

It has been known for at least twenty-five years that, in any device intended for regularizing the torques, it may be advantageous to realize, more or less exactly, certain "tuning" conditions between the frequency of the disturbances and the natural frequency of the oscillating masses.

It is quite obvious that the advantage of this "tuning" also exists, in general, for the devices embodying the present invention. The natural frequency of the oscillating weight member in said devices is the one which results from the action of the restoring member in determined conditions.

The connection between the restoring member and the corresponding oscillating member can be of any nature, such as cylindrical or spheric articulations, cams, balls, or rollers.

According to the present invention, the oscillating member preferably rocks or oscillates with little or very little friction; preferably, also, the restoring effects are substantially due solely to the action of the centrifugal forces, without elastic means.

However, it is within the scope of the present invention to employ frictional or elastic means, fluid means and the like, either for the restoring of the oscillating mass or for any other reason.

The advantages of the devices which the invention has for its object relative to known devices and especially to dampers utilizing centrifugal pendulums are very considerable for many different reasons. Those advantages may be substantially summed up as follows:

(a) They can be very easily adapted to the elimination of the lowest and highest harmonics.

(b) They are more efficient than the known dampers, especially those with centrifugal pendulums, under given conditions and for a given weight for the oscillating members.

(c) They make possible the utilization of the available space to the best advantage in the most simple manner.

(d) The conditions of resonance depend upon numerous and very different factors, which give great adaptability.

(e) For given conditions they are efficient at rotational speeds which are much lower than the lowest speeds at which known dampers are efficient.

(f) They avoid the use of noisy abutments and their working is always absolutely noiseless.

(g) They are of a very simple construction and of a very low cost.

(h) They afford in a very simple and efficient manner the elimination of two or several harmonics simultaneously with only one oscillating member.

A construction embodying the present invention is diagrammatically illustrated, by way of example, in the accompanying drawings of which:

Fig. 1 is a side elevation of an embodiment of the invention wherein the oscillating member is eccentric with respect to the axis of the shaft;

Fig. 2 is a bottom view of the device illustrated in Fig. 1;

Fig. 3 is a section taken substantially on line C—D of Fig. 1;

Fig. 4 is a sectional view taken substantially on line A—B of Figs. 2 and 3;

Fig. 5 is a side elevation of the oscillating member shown in Figs. 1 to 4, inclusive;

Fig. 6 is a sectional view taken on line T—U of Fig. 5; and,

Fig. 7 is a side elevation of one of the centrifugal members shown in Figs. 1 to 4, inclusive.

The drawings illustrate a device according to my invention mounted on the balance-weight of a machine shaft. Said machine could be, namely, an engine for any application, such as a radial or an in-line engine.

In the illustrated embodiment, the shaft 1, whereof the axis is O is integral with a web or arm 31 in which are bored two recesses 32 and 33 (Fig. 4) fitted with rings 34 and 35 that are preferably made of tempered, cemented steel. Also, the ring 34 is preferably forced into the web 31. The ring 35 can be loose.

The oscillating member 36 is carried by restoring levers which restore it to its mean position when it moves away to the right or to the left under the action of disturbances. Said rocking mass 36 is constituted by two plates shown in Figs. 5 and 6 and connected by three stays forced into the plates, and preferably keyed on them, and consequently unable to turn relatively to them. One of these stays is constituted by the cylinder 37 (Fig. 6) and the other two by the cylinders 38 (Figs. 4 and 6). The nuts 37a, 37b, 38a and 38b complete the arrangement (Fig. 6).

The cylinder 37 (Fig. 6) extends through the recess 32 of the web 31 (Figs. 3 and 4) and is constantly lifted up by the restoring levers toward the axis O and under those conditions it constantly bears against the generatrix I of the ring 34 (Fig. 4). The two other stays 38 act as axes for the restoring levers 43 which are visible in Figs. 1 to 4, inclusive. One of said levers is shown separately in Fig. 7.

Each of the restoring levers 43 (Fig. 7) is constituted by a long plate having one extremity 44 thicker, as can be seen in Fig. 2. This increased thickness at the extremity tends to increase the distance between the center of gravity of the lever and its axis 38 carried by the oscillating member 36. This axis is constituted by one of the stays 38 (Figs. 2 and 6) and to insure the centering of the lever 43 on said axis, said lever is provided with a cylindrical hole 38c (Fig. 7) which could be fitted with a ring.

Additionally, the lever 43 is provided with a recess 50 (Fig. 7) fitted with a ring 42 and is further provided with a hole 39. The hole 39 of this lever permits the passage of the axis 38 for the second restoring lever which is placed symmetrically on the other side of the balance weight, as shown in Fig. 2. In effect, this figure shows that one of the restoring levers 43, the one at the bottom as viewed in the drawings, is articulated on the left cylindrical stay 38 while the restoring lever at the top in said figure is articulated on the right cylindrical stay 38. The hole 39 permits this last stay to pass. Likewise, the long holes 51 and 52 provided in the web 31 (Fig. 4) permit the passage of the two axes 38 when the member 36 rocks.

As to the recess 50 (Fig. 7), the ring 42 transmits the restoring action to the rocking mass 36 through the roller 40, whereof the cheeks are numbered 41 (Fig. 3).

The operation is as follows: The mass 36 rocks about its mean position in a plane perpendicular to the axis of the shaft under the action of the disturbances and under the restoring action of the levers 43 of which, as it has been seen, the mass 36 carries the axes.

The action of levers 43 is as follows: Each of them under the action of centrifugal forces exerts a pressure on the roller 40 and through the said roller exerts a pressure on the wall of the recess 33, i. e., on the ring 35, carried by the web 31. Consequently, said web 31 exerts a reaction. This reaction of the web always tends to bring back to its mean position the structure constituted by the member 36 and the restoring levers 43 carried by the member 36.

The reactions due to the restoring levers give restoring torques which are added one to another and forces directed toward the axis O of the shaft which tend to move the mass 36 toward said axis. It results that the cylindrical stay 37 bears on the generatrix I (Fig. 4) with a force equal to the difference of this radial component due to the web and the centrifugal force exerted on the structure constituted by the member 36 and the restoring levers 43.

So, the oscillating member 36 rolls with direct rolling contact on the ring 34 to either side of the generatrix I.

Thus, the working is substantially the same as that in the case of the other embodiments disclosed in my above-mentioned parent application where the oscillating member is centered on the axis O of the rotary shaft 1, the only difference being that the oscillation around the generatrix I (or around generatrices quite close to the generatrix I) replaces the oscillations around the axis O. This operation is quite different from the operation of pendular systems.

The restoring torque thus obtained depends upon very varied factors, such as the positions and dimensions of the recesses, the relative values of the diameters of the rings and of the roller 40, the weight of the rocking mass 36, the radius of gyration of said mass, the weights of the restoring levers, and the position of the center of gravity of each of the restoring levers.

As a different embodiment, the restoring levers can rest on the web 31 in the opposite direction, the reaction of this web tending on the contrary to keep the movable structure away from the axis of the shaft 1. In this case, the cylinder 37 rocks while rolling around the generatrix J at the bottom of the ring 34 (Fig. 4), the working being substantially the same. This type of device, wherein the restoring levers are pivotally mounted on the rotating shaft rather than on the oscillating mass, is fully disclosed in my co-pending application Serial No. 333,561, filed May 6, 1940, now Patent No. 2,387,775 for "Oscillations Reducing Device."

As a particular case, the generatrix I can coincide with the axis O. The centering of the oscillating member 36 on said axis can be achieved as it is shown in Figs. 1 to 3 of my above-mentioned parent application, or by any known process such as by using ball, roller or needle bearings or any rolling device.

For the purpose of compensating flexional or lateral oscillations, similar devices can be used wherein the oscillating member rocks not in a plane perpendicular to the axis of the shaft but in a plane of any orientation relatively to said axis, namely, in a plane containing said axis. An example of such a structure is illustrated in Figs. 9 and 10 of my above-mentioned prior filed co-pending application Serial No. 333,561.

The devices comprehended by the invention can, in many cases, be tuned simultaneously on two or several harmonics. The described devices could be varied without exceeding the scope of the invention.

Having now particularly described and ascertained the nature of my said invention and in what manner the same operates, I declare that what I claim is:

1. In apparatus for reducing oscillations in structures, a rotatable member having a laterally extending portion provided with a curved path, an oscillating member mounted on the rotatable member for angular movement relative thereto, a plurality of relatively movable centrifugal restoring members pivotally mounted on said oscillating member, said restoring members having curved paths thereon, and force transmitting means having engagement with and movable along each of the aforesaid curved paths for transmitting the restoring action of said centrifugal members to said oscillating member.

2. A vibration damper comprising in combination with a rotatable member having a laterally extending portion provided with an arcuate path therein, an oscillating member formed of spaced rigidly connected elements mounted on said rotatable member for angular movement relative thereto, a pair of relatively movable centrifugal restoring levers pivotally mounted on the oscillating member, said levers being provided with arcuate paths thereon, and force transmitting means having engagement with each of the aforementioned arcuate paths for operatively connecting the rotating member and said levers, the pivotal axes of said levers being substantially diametrically disposed with respect to said force transmitting means.

3. In combination with a shaft having a laterally extending portion provided with an arcuate path, an oscillating member carried by said extending portion and angularly movable relative thereto, a pair of centrifugal members pivotally mounted on the oscillating member and having arcuate openings therein, and a roller having engagement with said arcuate path and said openings for operatively connecting the centrifugal members with the laterally extending portion, the center of gravity of each of the centrifugal members being spaced from the axis of rotation of the shaft.

4. In a device for reducing vibrations in a structure having a rotating member provided with an arcuate path, an oscillating member mounted thereon and having angular movement relative thereto, a plurality of relatively movable centrifugal restoring members mounted on the oscillating member for angular movement relative thereto, said restoring members having arcuate paths therein, and a roller having rolling engagement with the arcuate paths in the restoring members and the rotating member.

5. In a device for reducing vibrations in an apparatus having a rotating member provided with an arcuate path, an oscillating member mounted on the rotating member and having angular movement relative thereto, relatively movable centrifugal restoring members pivotally mounted on the oscillating member for angular movement relative thereto, said restoring members having arcuate paths therein, and means having free rolling engagement with the path in the rotating member and the paths in the restoring members for transmitting forces between said rotating and restoring members.

6. In apparatus of the class described, a rotatable member, an oscillatable member adapted to be supported by said rotatable member and adapted for oscillatory movement relative thereto about an axis eccentric to the axis of rotation of said rotatable member, centrifugally responsive means mounted on said oscillatable member, and means operatively connecting said centrifugally responsive means and said rotatable member for moving said oscillatable member to a mean position.

7. In apparatus for reducing oscillations, rotatable means, weight means adapted to be supported by said rotatable means and oscillatable relative thereto about an axis eccentric to the axis of rotation of said rotatable means, and means for resisting oscillation of said weight means including means pivotally mounted on said weight means and responsive to centrifugal forces.

8. Apparatus for reducing oscillations comprising rotatable means, weight means, and means operatively connecting said two first-named means whereby said weight means rotate with and are adapted for limited oscillation relative to said rotatable means about an axis eccentric to the axis of rotation of said rotatable means, said connecting means including centrifugally responsive means for restoring said weight means to said mean position from either side thereof.

9. Apparatus for reducing oscillations of a rotatable part comprising a damping mass, and means operatively connecting said mass and said part whereby said mass is caused to rotate with said part and is adapted for limited oscillation relative to said part about an axis spaced from the axis of rotation of said part, said connecting means being constituted solely by rigid elements and including centrifugally responsive means for yieldably maintaining said damping mass in a predetermined mean position relative to said part during rotation of the latter.

10. Apparatus for reducing oscillations of rotatable means comprising a damping mass, and means operatively connecting said mass and rotatable means whereby said mass is caused to rotate with said rotatable means and is adapted for limited oscillation relative to said rotatable means about an axis eccentric to the axis of rotation of said rotatable means, said connecting means including centrifugally responsive means and being such that movement of said centrifugally responsive means in response to centrifugal forces is positively limited by rigid means and also being such that said damping mass necessarily assumes a predetermined mean position relative to said rotatable means when said centrifugally responsive means is in its limiting position.

11. In a device for reducing vibrations in a structure having a rotating member, an oscillatable member mounted on the rotating member for oscillation about an axis eccentric to the axis of rotation of said rotating member, centrifugal restoring means mounted on the oscillatable member, and means operatively connecting said restoring means and rotating member for restoring the oscillatable member to a predetermined mean position relative to said rotating member.

12. In apparatus of the class described, rotatable means, weight means mounted for oscillatory movement relative to said rotatable means about an axis eccentric to the axis of rotation of said rotatable means, centrifugally actuated means movably carried by one of said two first-named means, and means operatively connecting said centrifugally actuated means and the other of said two first-named means for rendering the centrifugal force of said centrifugally actuated means effective to yieldably resist movement of said weight means in either direction from a predetermined mean position relative to said rotatable means.

13. In apparatus of the class described, rotatable means, weight means mounted for oscillatory movement relative to said rotatable means about an axis spaced from the axis of rotation of said rotatable means, centrifugally actuated means movably carried by one of said two first-named means, and means operatively connecting said centrifugally actuated means and the other of said two first-named means for rendering the centrifugal force of said centrifugally actuated means effective to apply a continuous force tending to maintain said weight means in a predetermined mean position relative to said rotatable means.

14. In apparatus of the class described, rotatable means, weight means mounted for limited linear and angular movement relative to said rotatable means, centrifugally actuated means movably carried by one of said two first-named means, and means operatively connecting said centrifugally responsive means and the other of said two first-named means for rendering the centrifugal force of said centrifugally actuated means effective to yieldably resist movement of said weight means from a predetermined mean position relative to said rotatable means.

15. In apparatus of the class described, rotatable means, weight means, each of said means having a curved surface, the curvature of said surfaces being appreciably different, and means for holding said surfaces in engagement during rotation of said rotatable means including centrifugally actuated means movably carried by one of said two first-named means and operatively connected with the other of said two first-named means, the centrifugal force of said centrifugally actuated means being effective to yieldably resist oscillatory movement of said weight means from a predetermined mean position relative to said rotatable means.

16. In apparatus of the class described, rotatable means, weight means having a curved surface thereon engageable with a curved surface of less curvature on said rotatable means, centrifugally actuated means movably carried by one of said two first-named means, and means operatively connecting said centrifugally actuated means and the other of said two first-named means for rendering the centrifugal force of said centrifugally actuated means effective to hold said surfaces in engagement with each other and to yieldably resist movement of said weight means from a predetermined mean position relative to said rotatable means.

17. A vibration damper for a rotatable shaft comprising a weight, means to suspend the weight off center relative to said shaft for oscillation of limited range, centrifugally actuated means, and lever means connecting said last-named means with said weight to bias the latter toward the shaft.

18. A vibration damper for rotatable systems comprising a rotatable support, an off center annular guide therein, a weight having suspension means movable within the guide, and means to bias the suspension means centripetally.

19. A vibration damper for a rotatable shaft comprising weight means suspended eccentrically to said shaft for rotation therewith and for limited angular and linear movement relative thereto, centrifugally actuated means, and means cooperating with said last-named means and said weight means to yieldably bias the weight means centripetally.

20. A vibration damper for a rotatable shaft comprising weight means suspended eccentrically to the axis of rotation of the shaft for rotation therewith and limited angular and radial movement relative thereto, and centrifugally actuated means tending normally to bias the weight means toward the shaft.

FRANÇOIS MARIE MICHEL BERNARD SALOMON.

REFERENCES CITED

The following references are of record in the file of this patent:

UNITED STATES PATENTS

| Number | Name | Date |
|---|---|---|
| 1,916,085 | Summers et al. | June 27, 1933 |
| 1,919,961 | Novak | July 25, 1933 |
| 2,103,643 | Salomon | Dec. 28, 1937 |
| 2,387,776 | Salomon | Oct. 30, 1945 |